United States Patent
Ng et al.

(10) Patent No.: US 10,421,125 B2
(45) Date of Patent: Sep. 24, 2019

(54) CONTROLLING AN INTENSITY PROFILE OF AN ENERGY BEAM IN ADDITIVE MANUFACTURING BASED ON TRAVEL DIRECTION OR VELOCITY

(71) Applicant: Applied Materials, Inc., Santa Clara, CA (US)

(72) Inventors: Hou T. Ng, Campbell, CA (US); Ron Naftali, Shoham (IL); Christopher G. Talbot, Emerald Hills, CA (US)

(73) Assignee: Applied Materials, Inc., Santa Clara, CA (US)

(\*) Notice: Subject to any disclaimer, the term of this patent is extended or adjusted under 35 U.S.C. 154(b) by 0 days.

(21) Appl. No.: 15/655,298

(22) Filed: Jul. 20, 2017

(65) Prior Publication Data
US 2018/0029127 A1    Feb. 1, 2018

Related U.S. Application Data (60) Provisional application No. 62/368,079, filed on Jul. 28, 2016, provisional application No. 62/438,706, filed on Dec. 23, 2016.

(51) Int. Cl.
   *B22F 3/105*   (2006.01)
   *B29C 64/135*   (2017.01)
   (Continued)

(52) U.S. Cl.
   CPC .......... *B22F 3/1055* (2013.01); *B29C 64/135* (2017.08); *B29C 64/153* (2017.08);
   (Continued)

(58) Field of Classification Search
   CPC ... B29C 64/118; B29C 64/141; B29C 64/165; B29C 64/205; B29C 64/209;
   (Continued)

(56) References Cited

U.S. PATENT DOCUMENTS

| 5,059,359 A | 10/1991 | Hull et al. |
| 5,137,662 A | 8/1992 | Hull et al. |

(Continued)

FOREIGN PATENT DOCUMENTS

| EP | 0744641 | 11/1996 |
| KR | 10-1624035 | 5/2016 |
| WO | WO 2016/094827 | 6/2016 |

OTHER PUBLICATIONS

International Search Report and Written Opinion in International Application No. PCT/US2017/043113, dated Sep. 15, 2017, 14 pages.

*Primary Examiner* — Loha Ben
(74) *Attorney, Agent, or Firm* — Fish & Richardson P.C.

(57) ABSTRACT

An additive manufacturing apparatus includes a platform, a dispenser to dispense layers of feed material on the platform, and a fusing system including an energy source to generate an energy beam having an adjustable intensity profile, an actuator to cause the energy beam to traverse across an outermost layer of feed material, and a controller coupled to the actuator and the energy source. The controller is configured to cause the energy source to adjust the intensity profile of the energy beam on the outermost layer of feed material based on a traversal velocity and/or a traversal direction of the light beam across the outermost layer of feed material.

20 Claims, 6 Drawing Sheets

(51) Int. Cl.
*B29C 64/171* (2017.01)
*B33Y 50/02* (2015.01)
*G02B 26/08* (2006.01)
*H04N 5/74* (2006.01)
*B29C 64/153* (2017.01)
*B29C 64/245* (2017.01)
*B33Y 10/00* (2015.01)
*B33Y 30/00* (2015.01)

(52) U.S. Cl.
CPC ........ *B29C 64/171* (2017.08); *G02B 26/0825* (2013.01); *H04N 5/7458* (2013.01); *B22F 2003/1056* (2013.01); *B22F 2003/1057* (2013.01); *B22F 2999/00* (2013.01); *B29C 64/245* (2017.08); *B33Y 10/00* (2014.12); *B33Y 30/00* (2014.12); *B33Y 50/02* (2014.12); *G02B 26/08* (2013.01); *Y02P 10/295* (2015.11)

(58) Field of Classification Search
CPC ..... B29C 64/20; B29C 64/245; B29C 64/264; B29C 64/268; B29C 64/135; B29C 64/153; B29C 64/171; B29C 64/277; B29C 64/386; B29C 64/40; B29C 64/307; B29C 64/321; B29C 64/393; H04N 5/7458; G02B 26/00; G02B 26/08; G02B 26/0816; G02B 26/0825; B22F 3/105; B22F 3/1055; B22F 2003/1056; B22F 2003/1057; B22F 2202/11; B22F 2203/03; B22F 2203/11; B22F 2999/00; B33Y 10/00; B33Y 30/00; B33Y 50/02; Y02P 10/295; B23K 26/02; B23K 26/035; B23K 26/36; B23K 26/04; B23K 26/042; B23K 26/08; B23K 26/0869; B28B 1/00; B28B 1/14; B28B 1/154

USPC ...... 359/290, 291, 293, 298; 419/23, 53, 56; 264/308, 401, 112, 405, 482, 485, 488, 264/400, 409, 497, 138, 139, 319, 642; 345/419, 420; 700/98, 117–120

See application file for complete search history.

(56) References Cited

U.S. PATENT DOCUMENTS

| | | | |
|---|---|---|---|
| 6,401,001 B1* | 6/2002 | Jang | H01L 21/288 204/192.15 |
| 6,405,095 B1* | 6/2002 | Jang | G05B 19/4099 264/308 |
| 6,780,368 B2* | 8/2004 | Liu | G03G 15/224 264/112 |
| 9,919,360 B2* | 3/2018 | Buller | B29C 64/40 |
| 9,962,767 B2* | 5/2018 | Buller | B29C 64/307 |
| 10,058,920 B2* | 8/2018 | Buller | B29C 64/307 |
| 10,207,454 B2* | 2/2019 | Buller | B29C 64/307 |
| 2012/0267345 A1 | 10/2012 | Clark et al. | |
| 2016/0199911 A1 | 7/2016 | Dave et al. | |
| 2017/0014906 A1* | 1/2017 | Ng | B29C 64/153 |
| 2017/0014907 A1* | 1/2017 | Ng | B22F 3/1055 |
| 2017/0036404 A1 | 2/2017 | Rengers et al. | |
| 2017/0072463 A1* | 3/2017 | Ng | B29C 64/153 |
| 2017/0072643 A1* | 3/2017 | Ng | B29C 64/20 |
| 2017/0072644 A1* | 3/2017 | Ng | B33Y 30/00 |
| 2017/0113419 A1 | 4/2017 | Han | |
| 2017/0165754 A1* | 6/2017 | Buller | B29C 64/307 |
| 2017/0165792 A1* | 6/2017 | Buller | B29C 64/307 |
| 2017/0232637 A1 | 8/2017 | Demuth et al. | |
| 2018/0029126 A1* | 2/2018 | Ng | B29C 64/135 |
| 2018/0079152 A1* | 3/2018 | Ng | B33Y 10/00 |
| 2018/0154484 A1 | 6/2018 | Hall | |
| 2018/0221953 A1* | 8/2018 | Ng | B29C 64/153 |
| 2018/0222114 A1* | 8/2018 | Ng | B29C 64/153 |

* cited by examiner

CONTROLLING AN INTENSITY PROFILE OF AN ENERGY BEAM IN ADDITIVE MANUFACTURING BASED ON TRAVEL DIRECTION OR VELOCITY

CROSS-REFERENCE TO RELATED APPLICATIONS

This application claims priority to U.S. Provisional Application Ser. No. 62/368,079, filed Jul. 28, 2016, and to U.S. Provisional Application Ser. No. 62/438,706, filed Dec. 23, 2016, each of which is incorporated by reference.

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some systems use an energy source for sintering or melting a powdered material. Once all the selected locations on the first layer are sintered or melted and then re-solidified, a new layer of powdered material is deposited on top of the completed layer, and the process is repeated layer by layer until the desired object is produced. In many of these methods, the energy source is a laser that emits an energy beam to fuse powder to form an object. Some laser-based methods melt or soften material to produce layers, e.g., selective laser melting (SLM) or direct metal laser sintering (DMLS), selective laser sintering (SLS), fused deposition modeling (FDM), while others use energy beams to cure liquid materials using different technologies, e.g. stereolithography (SLA). These processes can differ in the way layers are formed to create the finished objects and in the materials that are compatible for use in the processes.

SUMMARY

In one aspect, a fusing system for an additive manufacturing apparatus includes an energy source configured to emit an energy beam to fuse at least a portion of an outermost layer of feed material on a platform, a deformable mirror to receive the energy beam and reflect the energy beam, wherein a shape of the deformable mirror defines at least in part an intensity profile of the energy beam on the outermost layer of feed material, an actuator coupled to the deformable mirror, and a controller configured to cause the actuator to deform the shape of the deformable mirror to adjust the intensity profile of the energy beam on the outermost layer of feed material in accordance to a desired profile.

In another aspect, an additive manufacturing apparatus includes a platform, a dispenser to dispense layers of feed material on the platform, and a fusing system to direct an energy beam toward an outermost layer of feed material on the platform to fuse at least a portion of the outermost layer of feed material. The fusing system includes an energy source to emit the energy beam, a deformable mirror to receive the energy beam and reflect the energy beam, wherein a shape of the deformable mirror defines at least in part an intensity profile of the energy beam on the outermost layer of feed material, an actuator coupled to the deformable mirror, and a controller coupled to the actuator and configured to cause the actuator to deform the shape of the deformable mirror to adjust the intensity profile of the energy beam on the outermost layer of feed material in accordance to a desired profile.

In another aspect, a method of fabricating an object by additive manufacturing includes depositing a sequence of layers of feed material on a platform and fusing an outermost layer of feed material on a platform by directing an energy beam toward the outermost layer of feed material, and deforming a shape of a deformable mirror to adjust an intensity profile of the energy beam on the outermost layer of feed material in accordance to a desired profile.

Implementations of any of the above aspects may include one or more of the following features.

There may be a plurality of independently operable actuators. The actuators may be operable by the controller to deform the shape of the deformable mirror. The actuator may be operable by the controller to deform the shape of the deformable mirror to adjust a first dimension of the intensity profile of the energy beam on the outermost layer of feed material in a first dimension while maintaining a second dimension of the intensity profile of the energy beam.

The controller may be configured to cause the energy beam to traverse the outermost layer of feed material, and may generate control signals to deform the deformable mirror to adjust the intensity profile of the energy beam based on a traversal velocity or a traversal direction of the energy beam across the outermost layer of feed material. A movable mirror may redirect the energy beam. The controller may be configured to tilt the movable mirror to cause the energy beam to traverse the outermost layer of feed material. The controller may be configured to operate an actuator coupled to the energy source to cause the energy beam to traverse the outermost layer of feed material. The controller may be configured to operate an actuator coupled to the platform to cause the energy beam to traverse the outermost layer of feed material.

The deformable mirror may be first deformable mirror, and the fusing system may further include a second deformable mirror to receive the energy beam and reflect the energy beam. A shape of the second deformable mirror may be deformable to adjust the intensity profile of the energy beam on the outermost layer of feed material. The first deformable mirror and second deformable mirror may be configured such that the shape of the first deformable mirror defines the intensity profile of the energy beam on the outermost layer of feed material in a first dimension and the shape of the second deformable mirror defines the intensity profile of the energy beam on the outermost layer of feed material in a different second dimension. The first dimension may be perpendicular to the second dimension.

A detector may be configured to measure one or more parameters of a portion of the outermost layer. The controller may be configured to generate control signals to deform the shape of the deformable mirror based on the one or more parameters of a portion of the outermost layer. The one or more parameters may be at least one of a temperature, a temperature profile, a shape, a size, or a depth. The controller may be configured to generate the control signals to deform the shape of the deformable mirror based on a desired value for the one or more parameters and a measured value of the one or more parameters.

The controller may be configured to cause the energy source to cause the energy beam to create a melt pool in the outermost layer of feed material. The controller may be configured to determine a propagation velocity or propagation direction of the melt pool based on measured values of the one or more parameters, and generate control signals to deform the shape of the deformable mirror based on the propagation velocity or direction of the melt pool.

The controller may be configured to generate control signals to deform the shape of the deformable mirror based on an error of the intensity profile of the energy beam. The controller may be configured to generate control signals to deform the shape of the deformable mirror based on object data indicative of an object to be formed from the outermost layer of feed material. The controller is configured to determine a surface roughness of the object to be formed from the outermost layer of feed material based on the object data, and generate the control signals to deform the shape of the deformable mirror based on the surface roughness. The controller may be configured to determine whether the object data is indicative of a portion of the object being elongated along an axis, and generate the control signals to deform the shape of the deformable mirror such that a dimensional profile of the energy beam on the outermost layer of feed material is elongated along the axis.

Implementations can optionally provide (and are not limited to) one or more of the advantages described below and herein elsewhere. Deformation of the deformable mirror to adjust the intensity profile of the energy beam may achieve a desired intensity profile while avoiding energy loss, thus providing superior energy efficiency. Furthermore, because an appropriate amount of energy (in some cases more energy) is transferred to the feed material, the feed material may be fused more quickly and/or efficiently, thereby potentially increasing a fabrication speed for an object or a throughput of objects formed by the fusing system and/or improve quality of the object. The deformable mirror, by being deformed by the independently operable actuators, may have a deformable geometry that is controlled to adjust the intensity profile of the energy beam in accordance with a desired melt pool geometry. In this regard, the feed material that receives energy from the energy beam may be more uniformly heated, which may lead to increased quality and resolution of the object. As a result of the ease at which the intensity profile may be adjusted with reduced energy loss, the fusing system may include higher power lasers and multiple lasers to be used to fuse the feed material on the platform. The deformable mirror enables these energy beams from these devices to have intensity profiles that are easily adjustable for the requirements of the particular object to be formed. For example, the profile of the energy beam can be oriented to provide improved resolution of elongated features on the object.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

In an additive manufacturing apparatus, an energy source directs an energy beam toward a layer of fee material, e.g., a powder, on a platform to fuse a target portion of the layer of feed material. By irradiating the target portion, the energy beam imparts energy to the target portion to cause the fusing of the feed material. The distribution of the energy applied to the target portion is dependent on an intensity profile of the energy beam. In some situations, it is useful to cause the energy beam to have a desired intensity profile, for example, to account for material properties of the feed material, desired geometric and material properties of the object to be fabricated, and properties of and method of operation of the energy source. For example, proper selection of the intensity profile of the energy beam can provide improved uniformity in the distribution of energy as the beam scans, and thus improved uniformity of fusing of the feed material. Although a beam shaper that blocks selected portions of the beam, e.g., a digitally controlled liquid crystal device, such as a digitally addressable shutter device, could be used to control the intensity profile of the energy beam, such a system is energy inefficient as the blocked portion of the beam is not used. Moreover, at high intensities, there can be problems with heat dissipation of the blocked portion of the energy beam. In contrast, as described herein, actuators are operated to control a shape of a deformable mirror that receives the energy beam such that the deformable mirror adjusts the intensity profile of the energy beam in accordance to the desired intensity profile when the deformable mirror reflects the energy beam.

Figure 1:
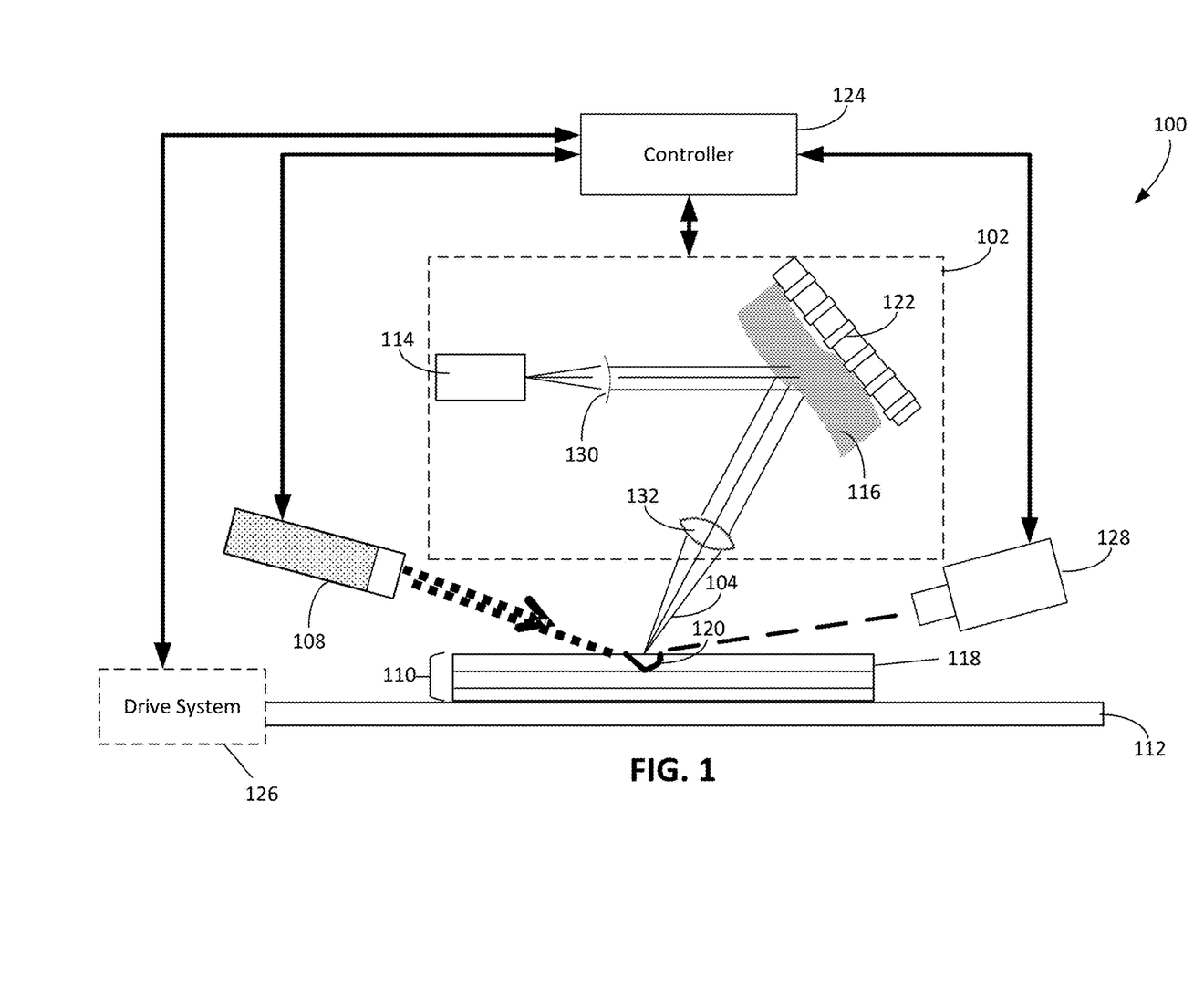
FIG. 1 is a schematic side view of an additive manufacturing apparatus including a fusing system.
Figure 2:
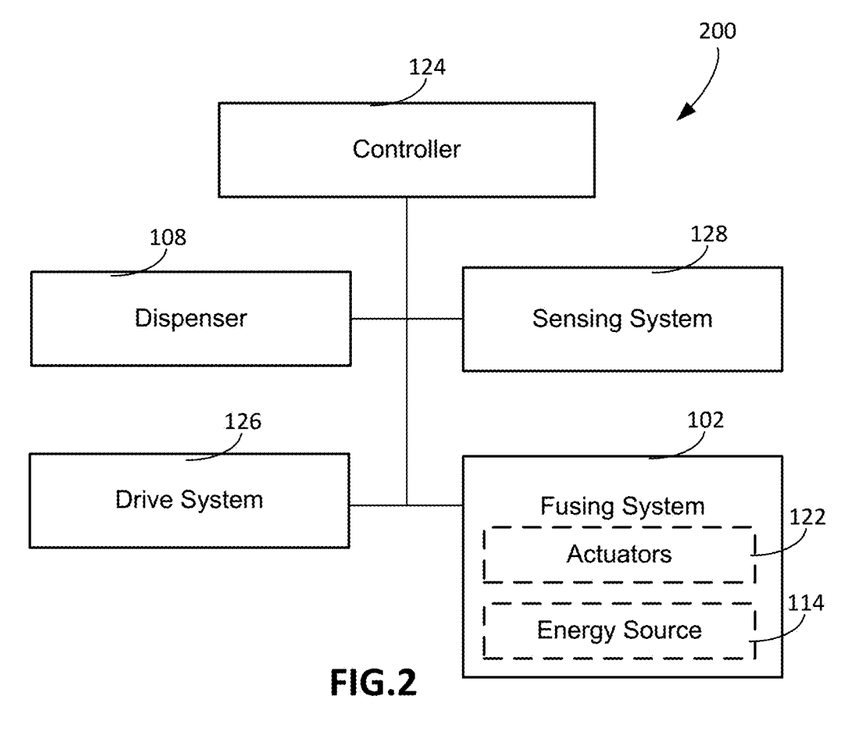
FIG. 2 is a block diagram of a control system for an additive manufacturing apparatus.

FIG. 1 depicts an example of an additive manufacturing apparatus 100 that includes a dispenser 108 to dispense layers 110 of feed material, e.g., powder, onto a platform 112, and a fusing system 102 that generates an energy beam 104 to fuse a portion of the layer 110. The fusing system 102 can adjust an intensity profile of the energy beam 104 using a deformable mirror 116. FIG. 2 depicts an example control system 200 to control systems of the additive manufacturing apparatus 100, for example, to control the fusing system 102 to adjust the intensity profile of the energy beam 104 in accordance to a desired intensity profile. Adjustment of the intensity profile can include adjustment of the intensity distribution within an illuminated spot (e.g., compare FIGS. 4A and 6A), and/or adjustment of a spot shape (e.g., see FIG. 7).

The fusing system 102 includes an energy source 114 to emit the energy beam 104. The fusing system 102 also includes the deformable mirror 116, which receives the energy beam 104 and reflects the energy beam 104 toward an outermost layer 118 of feed material on the platform 112. By proper selection of the intensity level, the energy beam 104 will fuse a target portion 120 of the outermost layer 118 of the feed material A shape of the deformable mirror 116 partly defines an intensity profile of the energy beam 104 on the outermost layer 118 of feed material. The fusing system 102 includes actuators 122 coupled to the deformable mirror 116. The actuators 122, when operated, adjust the intensity profile of the energy beam 104 by deforming the shape of the deformable mirror 116. The actuators 122 are independently operable by a controller 124 to deform the shape of the deformable mirror 116. In particular, the controller 124 selectively operates each of the actuators 122 to deform the shape of the deformable mirror 116 such that the intensity profile of the energy beam 104 on the outermost layer 118 of feed material is adjusted in accordance to the desired intensity profile.

Figure 3:
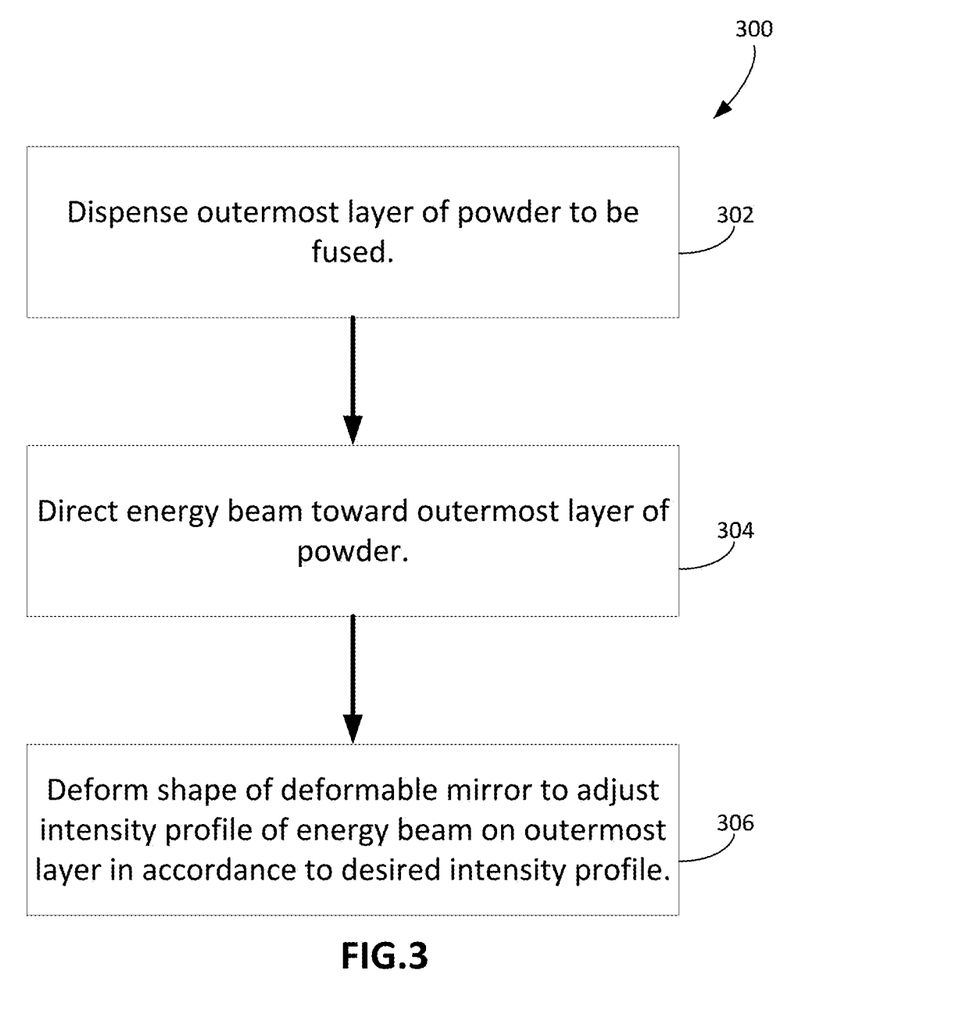
FIG. 3 is a flow chart for an additive manufacturing process.

In this regard, as shown in FIG. 3, during an example additive manufacturing process 300 to form an object, the controller 124 operates the dispenser 108 to dispense (302) the outermost layer 118 of the feed material that will be fused. The controller 124 then operates the fusing system 102 to direct (304) the energy beam 104 toward the outermost layer 118 of the feed material. The controller 124 also operates the fusing system 102 to deform (306) the shape of the deformable mirror 116 to adjust the intensity profile of the energy beam on the outermost layer 118 of the feed material in accordance with the desired intensity profile. This process of dispensing a layer of feed material and fusing a portion of the feed material is repeated iteratively, to form each successive layer of the object.

Returning to FIG. 1, the controller 124 can be operably connected to a drive system 126 of the additive manufacturing apparatus 100. The drive system 126, when driven, causes relative movement between the stage 112 and the energy beam 104. This causes relative motion between the outermost layer 118 of the feed material and the energy beam 104, such that the energy beam 104 can be directed to a desired portion of the outermost layer 118 of the feed material to fuse the feed material. The energy beam 104 emitted by the energy source 114 is able to traverse the outermost layer 118 of feed material to apply energy to multiple continuous areas of the outermost layer of feed material, discontinuous areas of the outermost layer of feed material, or combinations thereof.

In some cases, the energy source 114 of the fusing system 102 includes a laser to generate a laser beam as the energy beam 104. In some cases, the laser itself is movable horizontally above and across the platform 112 to scan the laser over the layer 118 of feed material. For example, the drive system 126 can include a linear actuator operable to move the laser. In some cases, to enable the relative movement of the dispensed feed material and the energy beam 104, the fusing system 102 includes a linear actuator operable with the platform 112 that, when driven, causes the platform 112 to move horizontally relative to the energy beam 104. In some cases, the laser beam is deflected by a galvo mirror, and the angle of orientation of the mirror is controlled to scan the laser.

Alternatively or additionally, the drive system 126 enables the platform 112 to move relative to the dispenser 108 such that feed material is selectively dispensable at any location above the platform 112. In some cases, a horizontal position of the dispenser 108 relative to the platform 112 is adjustable. For example, if the drive system 126 includes the linear actuator operable with platform 112, the linear actuator is driven to cause the platform 112 to move horizontally relative to the dispenser 108. Optionally, the dispenser 108 is operable with a linear actuator of the drive system 126 that enables the dispenser 108 to move horizontally above the platform 112.

In some examples, the drive system 126 is operable to adjust a vertical position of the platform 112 relative to the dispenser 108. After each layer of the feed material has been dispensed, the platform 112 can be lowered or the dispenser 108 can be raised so that the platform 112 is ready to receive a new layer of feed material. For example, the relative height between the outermost layer 118 of feed material and the dispenser 108 and/or fusing system 102 can be uniform from layer to layer. The drive system 126, for example, can include an actuator coupled to the dispenser 108 to raise the dispenser. In some cases, the drive system 126 includes a piston coupled to the platform 112 that causes the platform to be lowered or raised when the piston is operated.

In some implementations, the deformable mirror 116 is mounted to a stage that is movable. The deformable mirror 116 is, for example, arranged to reflect the energy beam 104 to be directed toward the outermost layer 118 of feed material. The stage is movable such that the energy beam 104 is selectively directed to the target portion 120 of the outermost layer 118 of feed material. The stage is, for example, operably connected to an actuator of the drive system 126 that, when driven, causes the stage to tilt. When the stage is tilted, the angle of the mirror relative to the received energy beam is adjusted, thereby enabling the reflected energy beam to be redirected to a target location on the outermost layer 118 of feed material.

The energy beam 104 is a collimated light beam that causes the target portion 120 of the outermost layer 118 of feed material to fuse by, for example, a sintering process, a melting and re-solidification process, or other process to cause the feed material to form a solid mass of material. In some implementations, the energy beam 104 emitted by the energy source 114 has a wavelength in a visible light range, an infrared light range, or an ultraviolet light range. In some implementations, the energy source 114 emits multiple discrete pulses of the energy beam 104 to fuse discontinuous portions of the outermost layer 118 of powder.

In some cases, the dispenser 108 includes a spreader, for example, a roller or blade, pushes a powder from a reservoir across the platform 112 to spread the powder into layers. In some cases, the dispenser 108 is positioned above the platform 112 and includes an opening through which feed material is dispensed, e.g., by gravity or by being ejected, onto the platform 112. The dispenser 108 can be connected to a reservoir storing the feed material, the feed material can be released when an electronically addressable gate is opened or an actuator is activated.

In some implementations, the dispenser 108 can controllably dispense individual voxels of the feed material to form a layer of the feed material. When dispensed on the platform 112, each voxel has a width of, for example, 10 µm to 1 mm (e.g., 10 µm to 30 µm, 20 µm to 40 µm, 30 µm to 50 µm, approximately 20 µm, approximately 30 µm, or approximately 50 µm). Each layer has a predetermined thickness. The thickness is, for example, 10 µm to 125 µm (e.g., 10 µm to 20 µm, 10 µm to 40 µm, 40 µm to 80 µm, 80 µm to 500 µm, approximately 15 µm, approximately 25 µm, approximately 60 µm, or approximately 100 µm).

In some implementations, the deformable mirror 116 is formed from a polymer membrane. The deformable mirror 116 is reflective such that the energy beam 104 is reflected when the deformable mirror 116 receives the energy beam 104. The deformable mirror 116, for example, is formed from a silicon nitride composite membrane that is coated with reflective material. The deformable mirror 116 is connected to the actuators 122, which, for example, apply control voltages to different portions of the deformable mirror 116 to cause selective deformation of portions of the deformable mirror 116. In some cases, the deformable mirror 116 includes electrodes through which the actuators 122 apply the control voltages. The deformable mirror 116 includes, for example, 10 to 40 electrodes (e.g., 10 to 20, 20 to 30, or 30 to 40 electrodes) spaced across the surface of the deformable mirror 116. The controller 124 independently operates each of the actuators 122 to deform a different portion of the deformable mirror 116.

In some implementations, the controller 124 operates the actuators 122 to deform the deformable mirror 116 based on data indicative of operations of the fusing system 102. The data is indicative of, for example, characteristics of the motion of the energy beam 104 relative to the platform 112, such as a traversal velocity or a traversal direction of the energy beam 104 across the outermost layer 118 of feed material. In some cases, the controller 124 determines the traversal velocity or the traversal direction based on the control signals transmitted to the drive system 126 that causes the relative motion of the energy beam 104 and the outermost layer 118.

Figure 4A:
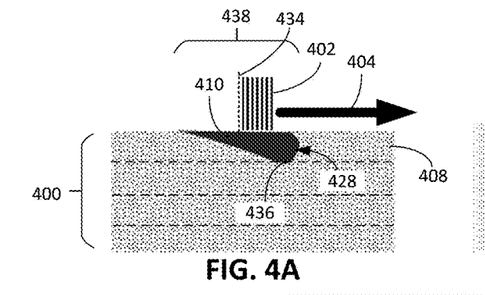
FIG. 4A is schematic side view of an example of a melt pool in a layer of powder.
Figure 4B:
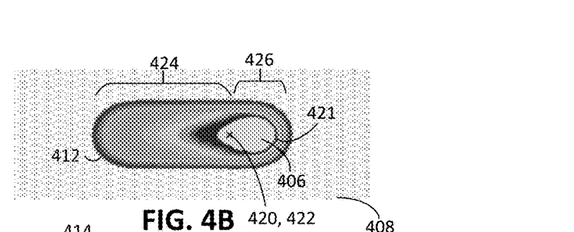
FIG. 4B is a schematic top view of a traversing energy beam on the layer of powder of FIG. 4A.

The traversal velocity or the traversal direction may influence an intensity profile of the energy beam 104 on the outermost layer 118 of feed material. FIGS. 4A and 4B illustrate an example in which layers 400 of feed material receive an energy beam 402 from, for example, the fusing system 102, and a traversal direction 404 or traversal velocity skews an intensity profile 406 of the energy beam 402. In the example shown in FIG. 4A, which shows a side view of the layers 400 of feed material, the energy beam 402 propagates along a target portion of an outermost layer 408 of feed material to form a melt pool 410. In this example, the energy beam 402 is redirected toward the outermost layer 408 of feed material without selective adjustment of the intensity profile 406 along the beam path from the energy source to the melt pool 410. The beam path may include optical devices such as, for example, mirrors, lenses, beam expanders, and other optical devices. These optical devices may passively adjust the intensity profile 406. In some cases, the beam path includes a deformable mirror (e.g., the deformable mirror 116) that is not actuated to cause selective adjustment of the intensity profile 406.

FIG. 4B depicts a top view of the outermost layer 408 of feed material and shows an intensity profile 406 of the energy beam 402 on the outermost layer 408 of feed material. As shown in FIG. 4B, when the energy beam 402 imparts energy to the outermost layer 408 of feed material, the energy beam 402 induces a temperature profile 412 on the outermost layer 408 of feed material. The temperature at the area where the energy beam 402 irradiates the outermost layer 408 corresponds to the highest temperature portion of the temperature profile 415, and the temperature decreases as a distance from the irradiation area increases. In some cases, the profile extends to layers below the outmost layer 408.

In some cases, the traversal direction 404 of the energy beam 402 influences the temperature profile 412. If the energy beam 402 were not traversing across the outermost layer 408 of feed material when it is applied to the outermost layer 408 of the feed material, referring to FIG. 4C, the energy beam 402 would have, for example, a circular intensity profile 414. The intensity profile 414 of the energy beam 402 on the outermost layer 408 of feed material would result in a temperature profile (not shown) in the form of a circular temperature gradient with temperature that decreases as a radial distance from the centroid 416 increases.

Turning back to FIG. 4B, traversal of the energy beam 402 in the traversal direction 404 may cause an overall intensity of the intensity profile 406 to be skewed in a direction opposite the traversal direction 404. For example, a centroid 420 has a position farther from a leading end 421 of the energy beam 402 as compared to the position of the centroid 416 of the intensity profile 414 when the energy beam 402 is not moving. The degree to which the centroid 420 is displaced from the leading end 421 of the energy beam 402, for example, increases as the traversal velocity in the traversal direction 404 increases.

In addition, as a result of the energy beam 402 traversing in the traversal direction 404, the temperature profile 412 may include a centroid 422 that has a position farther from the leading end 421 of the energy beam 402 as compared to the position of the centroid 416 of the intensity profile 414 when the energy beam 402 is not moving. The temperature profile 412 includes, for example, a trailing portion 424 and a leading portion 426 in which the trailing portion 424 has a lower temperature density than the temperature density of leading portion 426. Because of the skew of the temperature profile 412, the melt pool 410 has a depth profile 428 having a leading portion with a greater depth than a trailing portion. In this regard, the midpoint 434 of the length 438 of the melt pool 410 does not correspond to the deepest point 436 of the melt pool 410. Rather, the deepest point 436 is farther ahead of the midpoint 434 in the traversal direction 404.

In some implementations, it may be advantageous to counter the effect of the traversal velocity or the traversal direction on the intensity profile of the energy beam, on the temperature profile of the outermost layer of feed material, and on the depth profile of the melt pool. For example, referring back to FIG. 1, the controller 124 deforms the shape of the deformable mirror 116 using the actuators 122 to adjust the intensity profile of the energy beam 104 based on the traversal velocity or the traversal direction. In particular, the intensity profile is adjusted to counter or reduce the effect of the traversal velocity or the traversal direction on the intensity profile of the energy beam 104.

In some implementations, the controller 124 operates the actuators 122 based on a desired depth profile of a melt pool formed at the target portion 120. The controller 124, for example, determines a desired intensity profile of the energy beam based on the desired depth profile of the melt pool and accordingly deforms the deformable mirror 116 to achieve the desired intensity profile. If the controller 124 predicts that the intensity profile absent operation of the actuators 122 is substantially different than the desired depth profile, the controller 124 operates the actuators 122 to deform the deformable mirror 116 to adjust the intensity profile of the energy beam 104 such that the achieved depth profile more closely corresponds to the desired depth profile.

Figure 5A:
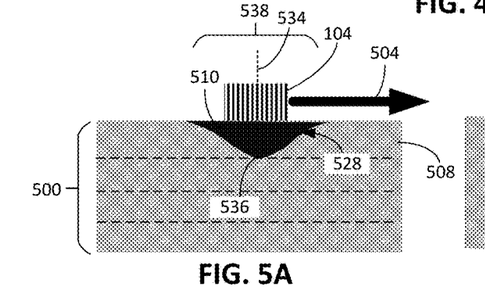
FIG. 5A is a schematic side view of another example of a melt pool in a layer of powder.
Figure 5B:
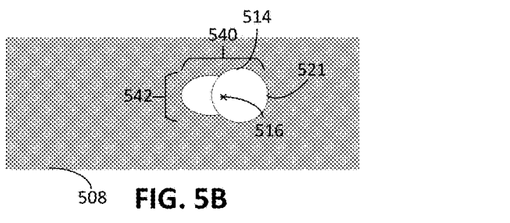
FIG. 5B is a schematic top view of an energy beam on the layer of powder of FIG. 5A.

FIG. 5A illustrates an example in which layers 500 of feed material receive an energy beam 502 from a fusing system, such as, for example, the fusing system 102, resulting in a melt pool 510 with a depth profile 528. In FIG. 5A, the energy beam 502 is traversing in the traversal direction 504 to form the melt pool 510. FIG. 5B depicts an intensity profile 514 of the energy beam 502 when the energy beam 502 is not traversing across the outermost layer 508 of the feed material.

Figure 4C:
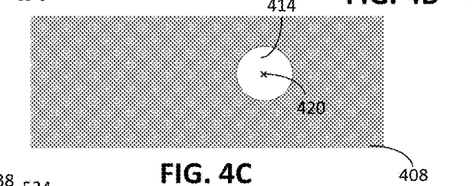
FIG. 4C is a schematic top view of a stationary energy beam on the layer of powder of FIG. 4A.

Unlike the intensity profile 414 of FIG. 4C, the intensity profile 514 of the energy beam 502 has been adjusted to account for the effect of the traversing of the energy beam 502 on the intensity profile and the depth profile. For example, if the fusing system that generates the energy beam 502 corresponds to the fusing system 102, referring back to FIG. 1, the controller 124 operates the actuators 122 to deform the deformable mirror 116 such that the depth profile 528 of the melt pool 510 corresponds to a desired depth profile. In the example of FIG. 5B, the intensity profile 514 has been adjusted such that the centroid 516 of the intensity profile 514 has a position farther from the leading end 521 of the energy beam 502 as compared to a position of the centroid 416 of the intensity profile 414.

Because of this relative displacement of the centroid 516, when the energy beam 502 traverses in the traversal direction 504, the skew effect on the intensity profile 514 leads to a resulting intensity profile (not shown) and a resulting temperature profile (not shown) that is substantially more elliptical than the intensity profile 406 and the temperature profile 412. The resulting ellipse formed, for example, has a major axis substantially parallel to the traversal direction 504 such that a line of melted feed material formed from the energy beam 502 has substantially more uniform depth than the line of melted feed material formed from the energy beam 402. Unlike the trailing portion 424 and the leading portion 426 of the temperature profile 412, the trailing portion and the leading portion of the temperature profile have substantially equal lengths. In this regard, as shown in FIG. 5A, the deepest point 536 of the melt pool 510 is substantially coincident with the midpoint 534 of the length 538 of the melt pool 510.

Figure 6A:
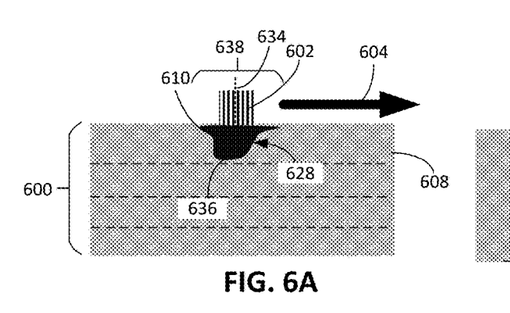
FIG. 6A is a schematic side view of yet another example of a melt pool in a layer of powder.
Figure 6B:
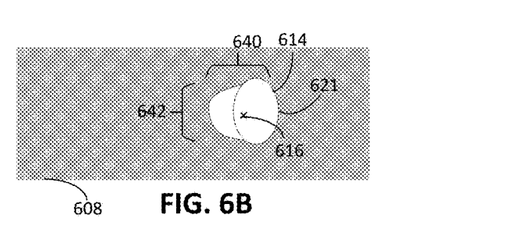
FIG. 6B is a schematic top view of an energy beam on the layer of powder of FIG. 6A.

In some implementations, it may be advantageous to decrease an overall length of a melt pool along the traversal direction, for example, to achieve a higher resolution for an object. FIG. 6A illustrates an example in which layers 600 of feed material receive an energy beam 602 from a fusing system, such as, for example, the fusing system 102, resulting in a melt pool with a depth profile 628. In FIG. 6A, the energy beam 602 is traversing in the traversal direction 604 to form the melt pool 610. FIG. 6B depicts an intensity profile 614 of the energy beam 602 when the energy beam 602 is not traversing across the outermost layer 608 of the feed material.

Similar to the intensity profile 514 of FIG. 5B, the intensity profile 614 of the energy beam 602 has been adjusted to account for the effect of the traversing of the energy beam 602 on the intensity profile and the depth profile. In addition, the intensity profile 614 has been adjusted to decrease a length 638 of the melt pool 610 along the traversal direction 604. For example, if the fusing system that generates the energy beam 602 corresponds to the fusing system 102, referring back to FIG. 1, the controller 124 operates the actuators 122 to deform the deformable mirror 116 such that, for instance, the depth profile 628 of the melt pool 610 corresponds to a desired depth profile. In the example of FIG. 6B, the centroid 616 of the intensity profile 614 has been skewed away from the leading end 621 relative to the centroid 416 of the intensity profile 414. In addition, a length 640 of the intensity profile 614 has been decreased relative to a length 540 of the intensity profile 514.

Because of the displacement of the centroid 616, when the energy beam 602 traverses in the traversal direction 604, the skew effect on the intensity profile 614 leads to a resulting intensity profile (not shown) and a resulting temperature profile (not shown) that is substantially more elliptical than the intensity profile 406 and the temperature profile 412. Unlike the trailing portion 424 and the leading portion 426 of the temperature profile 412, the trailing portion and the leading portion of the temperature profile have substantially equal lengths. In this regard, as shown in FIG. 6A, the deepest point 636 of the melt pool 610 is substantially coincident with the midpoint 634 of the length 638 of the melt pool 610. Furthermore, because of the decrease in length 640 of the intensity profile 614 compared to the length 540, the melt pool 610 has a smaller length 638.

Referring back to FIG. 1, as an alternative to or as an alternative to operating the actuators 122 based on a desired depth profile, the controller 124 operates the actuators 122 to deform the deformable mirror 116 to achieve a desired length, a desired width, and/or a desired maximum depth of the melt pool 610. For example, in some cases, the width 642 of the intensity profile 614 is greater than a width 542 of the intensity profile 514. The width (not shown) of the melt pool 610 is accordingly greater than the width of the melt pool 510. The melt pools 510 and 610 may each be in the form of an ellipse. The resulting ellipse for the melt pool 510 may have a major axis parallel to the traversal direction 504, whereas the resulting ellipse for the melt pool 610 may have a minor axis parallel to the traversal direction 604. The deformable mirror 116 is deformed such that the achieved length and the achieved width of the melt pool 610 correspond to the desired length and the desired width of the melt pool 610.

In some implementations, referring back to FIGS. 1 and 2, the additive manufacturing apparatus 100 includes a sensing system 128 to detect properties of the target portion 120, e.g., the melt pool formed at the target portion 120, and to detect properties of the energy beam 104. The sensing system 128 is operably connected to the controller 124. In this regard, the controller 124 can implement a closed-loop feedback process in which signals from sensors of the sensing system 128 serve as inputs into determining the control signals to be delivered to the actuators 122 to operate the actuators 122. The sensing system 128 includes, for instance, an optical sensor to measure one or more melt pool parameters. The melt pool parameters include one or more of a temperature, a temperature profile, a shape of the melt pool, a size of the melt pool, a width of the melt pool, a length of the melt pool, a propagation velocity of the melt pool, a depth of the melt pool, a depth profile of the melt pool, and other parameters of the melt pool that may be desirable to control to improve resolution, accuracy, precision, or accuracy of the additive manufacturing process. In one example, in the feedback process, the controller 124 receives a sensor signal measuring a value for a melt pool parameter and operates the actuators 122 to achieve a desired value for the melt pool parameter. The controller 124 operates the actuators 122 to deform the deformable mirror 116 based on the relative error between the measured value and the desired value.

In one example of a feedback control process, referring also to FIGS. 5A and 5B, if the controller 124 operates the actuators 122 to adjust the intensity profile 514 so as to achieve a desired depth profile for the melt pool 510, the controller 124 receives sensor signals from the sensing system 128 indicative of the depth or the depth profile of the melt pool 510. The controller 124 uses these sensor signals to implement a closed-loop feedback control process to maintain an error between the measured depth profile of the melt pool 510 and the desired depth profile of the melt pool 510 below a predefined threshold.

In another example of a feedback control process, referring to FIGS. 6A and 6B, if the controller 124 operates the actuators 122 to adjust the intensity profile 614 so to achieve a desired length and/or a desired width for the melt pool 610, the controller 124 receives sensor signals from the sensing system 128 indicative of the length and/or the width of the melt pool 610. The controller 124 uses these sensor signals to implement a closed-loop feedback control process to maintain an error between the measured length of the melt pool 610 and the desired length of the melt pool 610 below a predefined threshold, and/or to maintain an error between the measured width of the melt pool 610 and the desired width of the melt pool 610 below a predefined threshold.

In yet another example of a feedback control process, the controller 124 may receive sensor signals from a sensor of the sensing system 128 that detects a propagation velocity or a propagation direction of the melt pool, e.g., the melt pool 510 or the melt pool 610. The propagation direction corresponds to a traversal direction of the energy beam, e.g., the traversal direction 404, the traversal direction 504, and the traversal direction 604. Similarly, the propagation velocity corresponds to the traversal velocity of the energy beam. As discussed with respect to FIGS. 4A, 4B, 5A, 5B, 6A, and 6B, the traversal directions and the traversal velocities of the energy beams 402, 502, 602 influence the resulting intensity profile as the energy beams 402, 502, 602 traverse the outermost layers of feed material. In some implementations, when the controller 124 receives sensor signals indicative of the propagation velocity or the propagation direction of the melt pool, the controller 124 accordingly operates the actuators 122 to deform the deformable mirror 116 to adjust the intensity profile. In particular, the deformable mirror 116 is deformed such that the adjusted intensity profile counters or mitigates the effects on an intensity profile of an energy beam traversing across a layer of feed material.

In some implementations, the sensing system 128 includes a sensor, e.g., a photoelectric sensor, that detects an intensity profile of the energy beam upon being emitted by the energy source 114. The controller 124 generates control signals to deform the deformable mirror 116 based on aberrations detected by the sensor. The control signals, for example, cause the actuators 122 to deform the deformable mirror 116 such that the resulting intensity profile of the energy beam after reflecting off the deformable mirror 116 do not include the aberrations of the emitted energy beam. In some cases, the controller 124 controls the energy source 114 to emit an energy beam having a desired intensity profile. In response to detecting an error between the measured intensity profile and the desired intensity profile above a predetermined threshold, the controller 124 can adjust operation of the energy source 114 such that the emitted energy beam has an intensity profile that more closely corresponds to the desired intensity profile. Alternatively or additionally, the controller 124 operates the actuators 122 in response to the detected error. The actuators 122 are operated such that the deformable mirror 116 is deformed to reduce the effect of the error on the reflected energy beam.

In some implementations, the controller 124 receives sensor signals from a sensor of the sensing system 128 that detects a temperature or a temperature profile of the melt pool. The controller 124 operates the actuators 122 to deform the deformable mirror 116 such that the resulting intensity profile causes an increased rate at which a trailing portion of the melt pool cools. To achieve this increased cooling rate, referring to FIGS. 6A and 6B, the deformable mirror 116, when deformed, decreases the length 640 of the intensity profile 614 to cause a corresponding decrease in the length in the temperature profile. As a result, the trailing portion of the melt pool 610 may cool more quickly because a smaller length of the outermost layer 608 is exposed to the energy beam 602 at any given time.

In some implementations, the controller 124 uses a computer-aided design (CAD)-compatible file to control the additive manufacturing apparatus 100. The additive manufacturing apparatus 100, for example, operates the dispenser 108 to selectively dispense the feed material at predetermined locations on the platform 112 according to a printing pattern. The printing pattern can be stored in a non-transitory computer-readable medium as a CAD-compatible file. In some cases, the controller 124 operates the fusing system 102 to fuse portions of the layers 110 of feed material based on the printing pattern determined in the CAD-compatible file. The controller 124, for example, directs the energy beam 104 toward the layers 110 of feed material after each successive layer of feed material is dispensed to fuse portions of each successive layer of feed material. Alternatively or additionally, the controller 124 operates the fusing system 102 such that the energy beam 104 is selectively applied to selected portions of each successive layer of feed material. In this regard, the portions of the layers 110 of feed material are fused according to a desired geometry of the object to be formed.

In some implementations, based on the CAD-compatible file, the controller 124 determines a desired value for a parameter to use with the feedback control process of the actuators 122 described herein. For example, given a geometry of the object to be formed, the controller 124 may determine a desired length, a desired width, a desired depth, or other parameter of the melt pool.

In some implementations, the controller 124 determines a surface roughness of the object to be formed based on the CAD-compatible file. The controller 124 operates the actuators 122 using control signals such that the deformed shape of the deformable mirror 116 results in, for example, an intensity profile appropriate for the surface roughness. For example, for rougher surfaces, the deformable mirror 116 is deformed to achieve an intensity profile with a greater area, while for smoother surfaces, the deformable mirror 116 is deformed to achieve a more focused intensity profile.

In some implementations, the CAD-compatible file designates a resolution for a particular dimension of the object, and the controller 124 operates the actuators 122 to deform the deformable mirror 116 such that the intensity profile can achieve this resolution along that dimension. For instance, the deformable mirror 116 is deformed such that the intensity profile is sized along the particular dimension to achieve the desired resolution.

Figure 7:
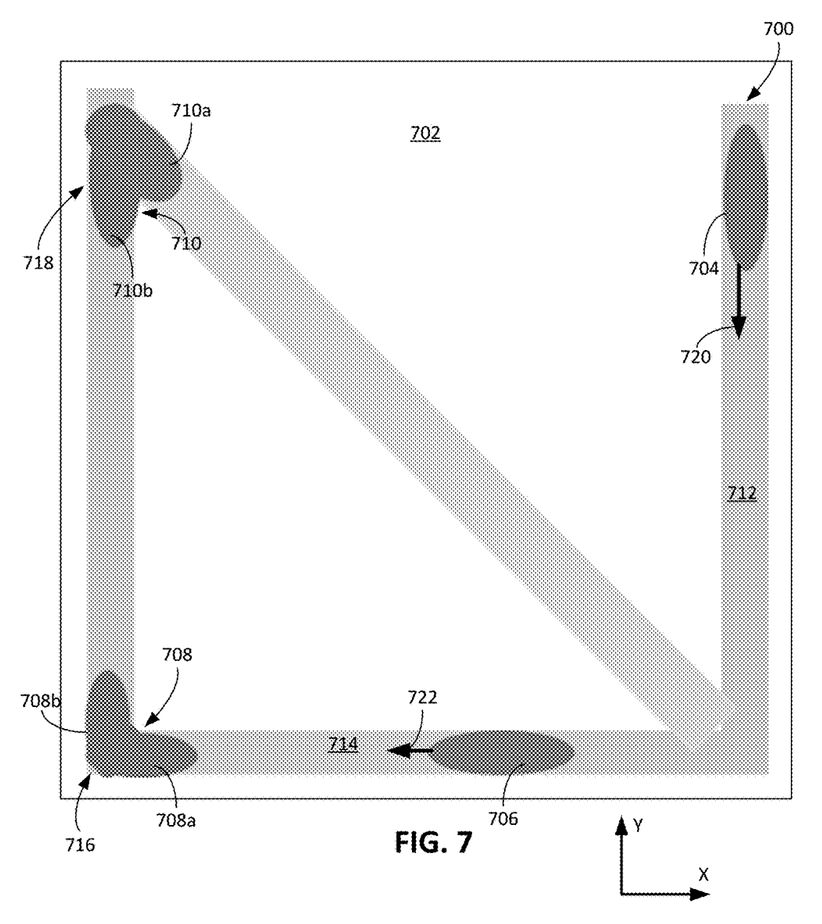
FIG. 7 is a schematic top view of an object formed by energy beams.

Referring to FIG. 7, which depicts a top view of an object 700 formed from feed material using an additive manufacturing apparatus, e.g., the additive manufacturing apparatus 100, geometry of the object 700 varies across a platform 702 on which the object 700 is supported. FIG. 7 illustrates intensity profiles 704, 706, 708, 710 of energy beams emitted during operation of a fusing system of the additive manufacturing apparatus to fuse portions 712, 714, 716, 718, respectively, of the object 700. The geometric characteristics of a given energy beam, including shape and size, are controlled based on the geometric characteristics of the portion of the object being formed.

In this regard, referring back to FIGS. 1 and 2, if the fusing system corresponds to the fusing system 102, the controller 124 operates the actuators 122 to control the intensity profile of the energy beam when the different portions 712, 714, 716, 718 are being formed. For example, when the portion 712 is being formed, the controller 124 operates the actuators 122 to deform the deformable mirror 116 such that the energy beam has the intensity profile 704. Similarly, when the portion 714 is being formed, the controller 124 operates the actuators 122 to deform the deformable mirror 116 such that the energy beam has the intensity profile 706. When the portion 716 is being formed, the controller 124 operates the actuators 122 to deform the deformable mirror 116 such that the energy beam has the intensity profile 708. When the portion 718 is being formed, the controller 124 operates the actuators 122 to deform the deformable mirror 116 such that the energy beam has the intensity profile 710.

In one example, the energy beam with the intensity profile 704 traverses in a traversal direction 720 parallel to the y-axis to form the portion 712 of the object 700, which corresponds to an elongate portion longitudinally extending along the y-axis. The shape of the intensity profile 704 is substantially an ellipse. The ellipse has a minor axis parallel to the x-axis that corresponds to a width of the portion 712 and a major axis that is parallel to the y-axis, e.g., parallel to the traversal direction 720.

In another example, the portion 714 of the object 700 corresponds to an elongate portion longitudinally extending along the x-axis. The energy beam with the intensity profile 706 traverses along a traversal direction 722 parallel to the x-axis to form the portion 714 of the object 700. The shape of the intensity profile 706 is also substantially an ellipse. In contrast to the intensity profile 704, the intensity profile 706 has a major axis parallel to the x-axis, e.g., the traversal direction, and a minor axis parallel to the y-axis and that corresponds to the width of the portion 714. Each of the intensity profiles 704, 706 of the energy beams is elongated along an axis along which their respective portion 712, 714 is elongated. Furthermore, each of the intensity profiles 704, 706 is elongated along an axis parallel to their respective traversal direction 720, 722 to increase a speed at which their respective portions 712, 714 are formed. In addition, the widths of the intensity profiles 704, 706 of the energy beams are selected to span a width of their respective portions 712, 714 such that these energy beams need only to traverse once across the platform 702 to form their portions 712, 714.

In a further example, the portion 716 of the object 700 corresponds to a corner formed by portions connected at a perpendicular angle. Accordingly, the intensity profile 708 of the energy beam has a shape that matches the shape of the corner. The intensity profile 708 includes one portion 708a that extends along one of the connecting portions, and another portion 708b that extends along the other of the connecting portions. In yet another example, the portion 718 of the object 700 corresponds to a corner formed by portions connected at an acute angle. Accordingly, the intensity profile 710 of the energy beam has a shape that matches the shape of the corner. The intensity profile 710 includes one portion 710a that extends along one of the connecting portions, and another portion 710b that extends along the other of the connecting portions.

A number of implementations of additive manufacturing apparatuses, additive manufacturing processes, fusing systems, and fusing processes have been described. Nevertheless, it will be understood that various modifications may be made. For example, in some implementations, turning back to FIG. 1, the fusing system 102 can include passive optical devices, such as a beam expander 130 and an objective lens 132. The beam expander 130 expands the energy beam 104 such that the deformable mirror 116 receives an energy beam with an intensity profile having a greater area. In this regard, the actuators 122 operable with the deformable mirror 116 cause deformations having a larger dimensional scale than if the beam expander 130 were absent. The objective lens 132 in turn focuses the energy beam reflected by the deformable mirror 116 to refocus the size of the target portion 120 that receives the energy beam. The combination of the beam expander 130 and the objective lens 132 may enable controllability of adjusting the intensity profile using the deformable mirror 116 in combination with the beam expander 130 without sacrificing a resolution when fusing the target portion 120 with the energy beam.

Figure 8:
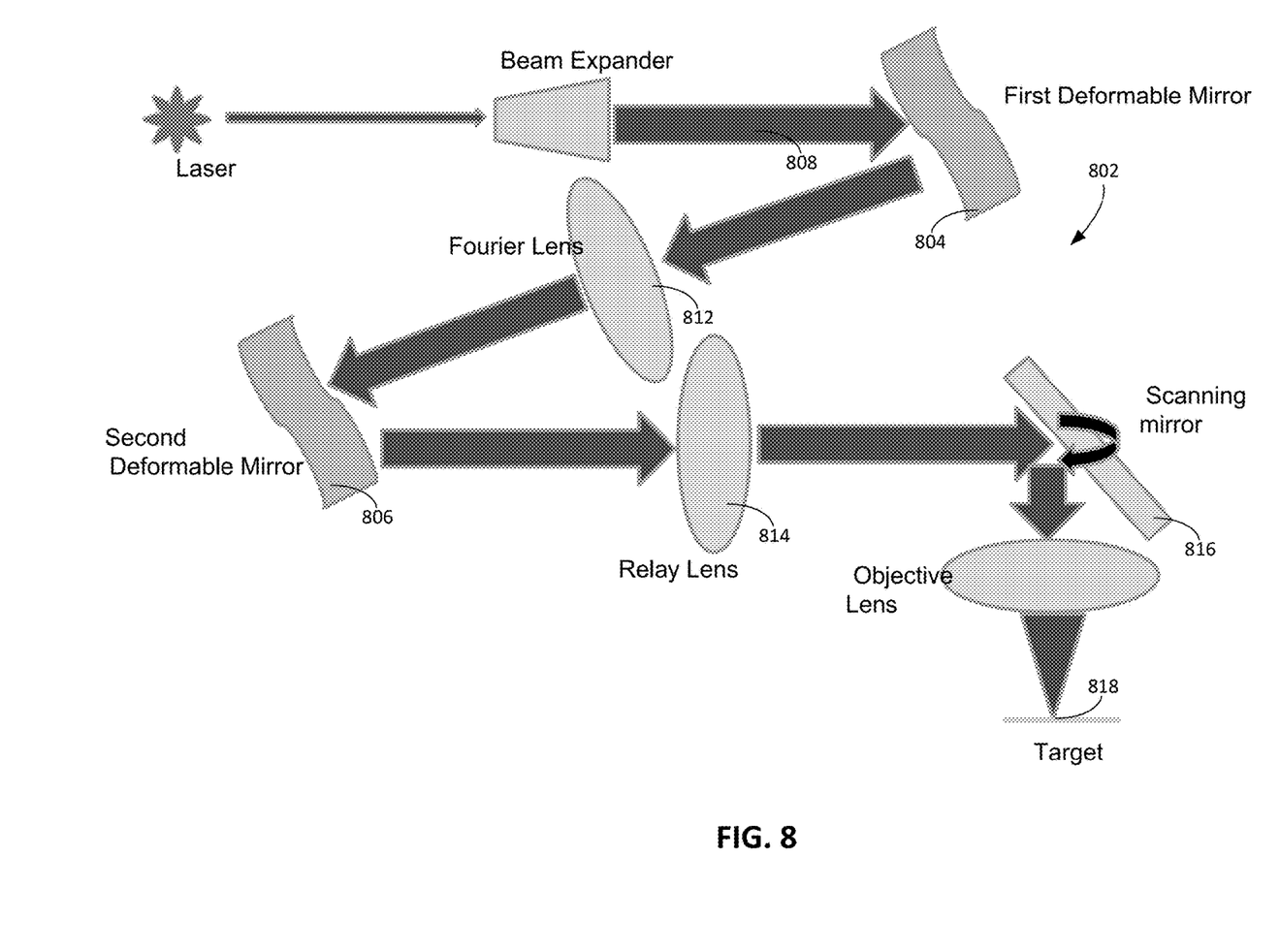
FIG. 8 is a schematic side view of an example of a fusing system.

In some implementations, the fusing system 102 includes multiple deformable mirrors. Each deformable mirror may be used to adjust the intensity profile of the energy beam along a different dimension. For example, FIG. 8 depicts a fusing system 802 including a first deformable mirror 804 and a second deformable mirror 806. Both deformable mirrors 804, 806 are deformed by operation of actuators.

The first deformable mirror 804, when deformed, causes adjustments in an intensity profile of an energy beam 808 along a first axis, e.g., an x-axis, while the second deformable mirror 806, when deformed, causes adjustments in the intensity profile of the energy beam 808 along a second axis, e.g., a y-axis. When the first deformable mirror 804 reflects the energy beam 808, the intensity profile along the first axis is adjusted while the intensity profile along the second axis is maintained. In contrast, when the second deformable mirror 806 reflects the energy beam 808, the intensity profile along the second axis is adjusted while the intensity profile along the first axis is maintained. The fusing system 800 having the multiple deformable mirrors 804, 806 provides an additional degree of freedom over fusing systems with a single deformable mirror. In this regard, a greater resolution of control of the intensity profile of the energy beam 808 can be achieved.

In some implementations, the fusing system 802 includes a Fourier lens 812 to reduce noise along one or more dimensions of the intensity profile of the energy beam 808. In some cases, the fusing system 802 includes a relay lens 814 to invert the intensity profile of the energy beam 808.

While the deformable mirror has been described to be mountable to a stage to manipulate a reflection direction of the energy beam, in some cases, the fusing system 802 includes a scanning mirror 816 distinct from the deformable mirrors 804, 806. The scanning mirror 816 is movable to enable a target position 818 along an outermost layer of feed material to be controlled. The scanning mirror 816 is, for instance, rotatable such that the energy beam 808 is redirected toward the target position 818.

In some implementations, as part of deforming the deformable mirror 116 to adjust the intensity profile of the energy beam, the actuators 122, when operated deform the deformable mirror 116 to adjust a distribution of energy of the energy beam. For example, the intensity profile is adjusted such that a first portion of the intensity profile has a greater energy density than another portion of the intensity profile.

In some implementations, multiple energy beams are emitted onto the outermost layer 118 of feed material. Each energy beam has an associated deformable mirror such that the intensity profile of each energy beam is precisely controllable. In some cases, multiple energy sources each emit an energy beam. In some implementations, the fusing system 102 includes a beam splitter to divide an energy beam into multiple energy beams.

Although FIGS. 4A, 5A and 6A illustrate the melt pool as being formed only in the uppermost layer of the deposited layers of powder, this is not required. In some implementations, the melt pool extends through multiple layers of powder. In this case, the velocity of the energy beam 402 can be selected so as to adjust the total depth of the melt pool, e.g., the number of layers of powder through which the melt pool extends.

The controller, e.g., the controller 124, can be implemented in digital electronic circuitry, or in computer software, firmware, or hardware, or in combinations of them. The controller can include one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Accordingly, other implementations are within the scope of the claims.

What is claimed is:

1. An additive manufacturing apparatus comprising:
   a platform;
   a dispenser to dispense layers of feed material on the platform;
   a fusing system including an energy source to generate an energy beam having an adjustable intensity profile and an actuator to cause the energy beam to traverse across an outermost layer of feed material; and
   a controller coupled to the actuator and the energy source and configured to cause the energy source to adjust the intensity profile of the energy beam on the outermost layer of feed material based on a traversal velocity and/or a traversal direction of the energy beam across the outermost layer of feed material.

2. The additive manufacturing apparatus of claim 1, wherein the fusing system comprises a movable mirror to redirect the energy beam, and the controller is configured to tilt the movable mirror to cause the energy beam to traverse the outermost layer of feed material.

3. The additive manufacturing apparatus of claim 1, wherein the actuator is coupled to the energy source or the platform to cause relative motion therebetween to cause the energy beam to traverse the outermost layer of feed material.

4. The additive manufacturing apparatus of claim 1, wherein the controller is configured to generate control signals to adjust the intensity profile based on object data indicative of an object to be formed from the outermost layer of feed material.

5. The additive manufacturing apparatus of claim 4, wherein the controller is configured to determine whether the object data is indicative of a portion of the object being elongated along an axis.

6. The additive manufacturing apparatus of claim 5, wherein the controller is configured to determine the traversal velocity and/or the traversal direction of the energy beam across the outermost layer of feed material based on the portion of the object being elongated along the axis.

7. The additive manufacturing apparatus of claim 5, wherein the controller is configured to generate the control signals to cause the profile of the energy beam on the outermost layer of feed material to be elongated along the axis.

8. The additive manufacturing apparatus of claim 1, wherein the fusing system is configured to direct the energy beam toward the outermost layer of feed material to cause a melt pool to form in the outermost layer of feed material.

9. The additive manufacturing apparatus of claim 8, and comprising a sensor to measure one or more parameters of the outermost layer of feed material, wherein the one or more parameters comprise at least one of a temperature, a temperature profile, a shape, a size, or a depth of the melt pool.

10. The additive manufacturing apparatus of claim 9, wherein the controller is configured to determine a propagation direction and/or propagation of the melt pool based on measured values of the one or more parameters, and the propagation direction and/or propagation provide traversal velocity and/or traversal direction.

11. An additive manufacturing apparatus comprising:
    a platform;
    a dispenser to dispense layers of feed material on the platform;
    a fusing system including an energy source to generate an energy beam having an adjustable intensity profile and an actuator to cause the energy beam to traverse across an outermost layer of feed material; and
    a controller coupled to the actuator and the energy source, the controller configured to receive object data indicative of an object to be formed, to determine whether the object data is indicative of a portion of the object being elongated along an axis, and to cause the energy source to adjust the intensity profile of the energy beam on the outermost layer of feed material such that the intensity profile of the energy beam on the outermost layer of feed material is elongated along the axis.

12. The additive manufacturing apparatus of claim 11, wherein the fusing system comprises a movable mirror to redirect the energy beam, and the controller is configured to tilt the movable mirror to cause the energy beam to traverse the outermost layer of feed material.

13. The additive manufacturing apparatus of claim 11, wherein the actuator is coupled to the energy source or the platform to cause relative motion therebetween to cause the energy beam to traverse the outermost layer of feed material.

14. The additive manufacturing apparatus of claim 11, wherein the controller is configured to determine a traversal velocity and/or a traversal direction of the energy beam across the outermost layer of feed material based on the portion of the object being elongated along the axis.

15. The additive manufacturing apparatus of claim 11, wherein the fusing system is configured to direct the energy beam toward the outermost layer of feed material to cause a melt pool to form in the outermost layer of feed material.

16. A method of fabricating an object by additive manufacturing, comprising:
    depositing a sequence of layers of feed material on the platform; and
    fusing an outermost layer of feed material on a platform by
        directing an energy beam toward the outermost layer of feed material,
        determining a traversal velocity and/or traversal direction of the energy beam across the outermost layer of feed material, and
        adjusting an intensity profile of the energy beam on the outermost layer of feed material based on the traversal velocity and/or traversal direction of the energy beam.

17. The method of claim 16, comprising tilting a movable mirror to cause the energy beam to traverse the outermost layer of feed material.

18. The method of claim 16, comprising moving an energy source relative to the platform to cause the energy beam to traverse the outermost layer of feed material.

19. The method of claim 16, comprising receiving object data indicative of an object to be formed, determining whether the object data is indicative of a portion of the object being elongated along an axis, and determining a traversal velocity and/or a traversal direction of the energy beam across the outermost layer of feed material based on the portion of the object being elongated along the axis.

20. The method of claim 16, comprising directing the energy beam toward the outermost layer of feed material to cause a melt pool to form in the outermost layer of feed material, and determining a propagation velocity and/or propagation direction of the melt pool based on measured values of one or more parameters of the outermost layer of feed material, the propagation velocity and/or propagation direction providing the traversal velocity and/or traversal direction.

* * * * *

UNITED STATES PATENT AND TRADEMARK OFFICE
CERTIFICATE OF CORRECTION

PATENT NO. : 10,421,125 B2
APPLICATION NO. : 15/655298
DATED : September 24, 2019
INVENTOR(S) : Hou T. Ng, Ron Naftali and Christopher G. Talbot Page 1 of 1

It is certified that error appears in the above-identified patent and that said Letters Patent is hereby corrected as shown below:

In the Claims

Column 17, Line 7, in Claim 16, delete "the" and insert -- a -- therefor.

Column 17, Line 9, in Claim 16, delete "a" and insert -- the -- therefor.

Column 17, Line 10, in Claim 16, delete "by" and insert -- by: -- therefor.

Signed and Sealed this
Tenth Day of December, 2019

Andrei Iancu
*Director of the United States Patent and Trademark Office*